US011255298B2

(12) United States Patent
Kuske et al.

(10) Patent No.: US 11,255,298 B2
(45) Date of Patent: *Feb. 22, 2022

(54) METHODS AND SYSTEMS FOR AN ENGINE

(71) Applicant: Ford Global Technologies, LLC, Dearborn, MI (US)

(72) Inventors: Andreas Kuske, Geulle (NL); Hans Guenter Quix, Herzogenrath (DE); Paul Nigel Turner, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,388

(22) Filed: Apr. 23, 2020

(65) Prior Publication Data

US 2020/0355142 A1    Nov. 12, 2020

(30) Foreign Application Priority Data

May 6, 2019 (DE) .................. 102019206450.7

(51) Int. Cl.
| F02M 26/06 | (2016.01) |
| F02M 26/28 | (2016.01) |
| F02M 26/10 | (2016.01) |
| F02M 26/25 | (2016.01) |
| F02B 29/04 | (2006.01) |

(52) U.S. Cl.
CPC ............ *F02M 26/06* (2016.02); *F02M 26/28* (2016.02); *F02B 29/0418* (2013.01); *F02B 29/0493* (2013.01); *F02M 26/10* (2016.02); *F02M 26/25* (2016.02)

(58) Field of Classification Search
CPC ........ F02M 26/06; F02M 26/28; F02M 26/10; F02M 26/25; F02B 29/0418; F02B 29/0493
USPC .............. 60/605.2, 605.1, 599; 123/563, 565
See application file for complete search history.

(56) References Cited

U.S. PATENT DOCUMENTS

| 2,918,787 | A | * | 12/1959 | Schelp ................ F02B 29/0475 60/599 |
| 3,866,423 | A | * | 2/1975 | Benisek ............. F02B 29/0481 60/599 |
| 4,204,848 | A | * | 5/1980 | Schulmeister ...... F02B 29/0406 60/599 |
| 4,385,496 | A | * | 5/1983 | Yamane ............. F02B 29/0493 60/599 |
| 5,617,726 | A | * | 4/1997 | Sheridan ................ F02M 26/25 60/605.2 |
| 5,797,265 | A | * | 8/1998 | Hagglund ........... F02B 29/0412 60/599 |
| 5,802,846 | A |   | 9/1998 | Bailey |

(Continued)

FOREIGN PATENT DOCUMENTS

| DE | 19644892 A1 * | 4/1998 | ......... F04D 29/4213 |
| DE | 10344521 A1 | 5/2005 | |

(Continued)

*Primary Examiner* — Thai Ba Trieu
(74) *Attorney, Agent, or Firm* — Geoffrey Brumbaugh; McCoy Russell LLP

(57) ABSTRACT

Methods and systems for an engine intake system are provided. In one example, a system includes a first charge air cooler arranged upstream of a second charge air cooler. The first charge air cooler is configured to provide thermal transfer between a compressed charge air and a fresh intake air.

18 Claims, 2 Drawing Sheets

(56) References Cited

U.S. PATENT DOCUMENTS

| | | | |
|---|---|---|---|
| 6,644,272 B2 | 11/2003 | Furukawa et al. | |
| 6,817,348 B2 * | 11/2004 | Wettergard | F02B 29/0412 |
| | | | 123/559.1 |
| 8,028,522 B2 * | 10/2011 | Irmler | F02M 26/24 |
| | | | 60/599 |
| 8,328,591 B2 * | 12/2012 | Larson | F02B 29/0437 |
| | | | 440/88 A |
| 9,109,505 B2 | 8/2015 | Ulrey et al. | |
| 9,316,185 B2 * | 4/2016 | Komiyama | F02B 29/0443 |
| 9,605,587 B2 * | 3/2017 | Cunningham | F02B 29/0493 |
| 9,835,080 B2 * | 12/2017 | Bauer | F02B 29/0443 |
| 2010/0132355 A1 * | 6/2010 | Michels | F02M 26/06 |
| | | | 60/605.2 |
| 2015/0240826 A1 * | 8/2015 | Leroy | F02B 29/0418 |
| | | | 415/1 |
| 2015/0315960 A1 * | 11/2015 | Thomas | F02B 29/04 |
| | | | 123/564 |
| 2017/0101968 A1 | 4/2017 | Hayashi | |
| 2019/0093608 A1 * | 3/2019 | Shonk | F02B 29/0475 |
| 2020/0340431 A1 * | 10/2020 | Kindl | F02M 26/22 |

FOREIGN PATENT DOCUMENTS

| | | | | |
|---|---|---|---|---|
| DE | 102012213165 A1 | | 1/2014 | |
| DE | 102015200172 A1 | | 7/2016 | |
| DE | 102017209037 A1 | | 12/2018 | |
| FR | 2917128 A1 * | | 12/2008 | F02B 37/16 |
| FR | 2949140 A1 * | | 2/2011 | F02B 39/12 |
| GB | 2531340 A | | 4/2016 | |
| WO | WO-2018231099 A1 * | | 12/2018 | F02B 29/0431 |

* cited by examiner

METHODS AND SYSTEMS FOR AN ENGINE

CROSS REFERENCE TO RELATED APPLICATIONS

The present application claims priority to German Application No. 102019206450.7 entitled "METHODS AND SYSTEMS FOR AN ENGINE" filed on May 6, 2019. The entire contents of the above-listed application are hereby incorporated by reference for all purposes.

FIELD

The present description relates generally to methods and systems for adjusting a compressed air flow during engine conditions.

BACKGROUND/SUMMARY

Government standards for internal combustion engines of motor vehicles with respect to efficiency and pollutant emissions are becoming stricter. One measure for reducing pollutant emissions is exhaust gas recirculation (EGR), in which part of the exhaust gas stream leaving the engine is diverted through an EGR line and returned to the engine together with aspirated fresh air. In some cases, exhaust gas recirculation only takes place under specific conditions, e.g. with a sufficiently heated engine. In some countries however, it may be prescribed that exhaust gas recirculation is also performed with a cold engine, i.e. during the start of the engine for example. In particular, for low-pressure EGR systems, low temperatures may lead to condensation of moisture which may be contained in the recirculated exhaust gas or supplied fresh air, since the temperature lies below the dew point. In the case of a charged engine, condensation or even ice formation may occur before or in the region of the compressor. The flow of condensate and/or ice toward the compressor may degrade (e.g., crack) one or more compressor blades.

As one solution, a coolant circuit may be used to heat the intake air. The coolant circuit may be a dedicated engine coolant circuit. However, the temperature of the corresponding coolant on cold start lies in the region of the ambient temperature, so no effective heating may be achieved in this way without an auxiliary device. Another conceivable solution is to heat the aspirated fresh air or intake air with an electric heating element. This solution is however technically complex and extremely inefficient, in particular from an energy aspect. Furthermore, the auxiliary device, which may include the electric heating element, may increase packaging size of the intake system, which may be disadvantageous and even unusable in some configurations.

GB 2 531 340 A describes an air supply system for a charged internal combustion engine. According to one embodiment, a high-temperature heat exchanger is arranged directly downstream of a compressor, wherein a first line is provided with a low temperature heat exchanger downstream of the high-pressure heat exchanger, and a bypass line which bypasses the low-temperature heat exchanger and joins the first line downstream thereof. Two valves are provided firstly in the first line and secondly in the bypass line in order to set the relative gas flows. Optionally, an exhaust gas recirculation may also be provided. However, these heat exchangers are fluidly coupled to a liquid heat transfer medium, such as a coolant or engine coolant. The exchangers may be fluidly coupled to separate circuits in order to provide different heating/cooling properties.

U.S. 2017/0101968 A1 discloses a charged internal combustion engine with a compressor and an EGR line which connects a supply line upstream of the compressor with an exhaust gas line downstream of the compressor. An EGR valve is arranged in the EGR line. A bypass line connects the supply line downstream of the compressor and the EGR line immediately downstream of the EGR valve. In a first configuration, the supplied air which has passed through the compressor is guided through the supply line and flows into a cylinder, whereas in a second configuration in which the EGR valve is closed, part of the supplied air which has passed through the compressor passes through the bypass line and the EGR line and is returned to the supply line above the compressor.

DE 10 2015 200 172 A1 discloses a device for reducing condensate formation upstream of the compressor of a turbocharged motor vehicle internal combustion engine, with low-pressure exhaust gas recirculation from an exhaust gas aftertreatment device via an exhaust gas recirculation cooler into an air inlet channel, which has a first inlet arranged upstream of the compressor for the exhaust gas recirculated by the exhaust gas aftertreatment device and a second inlet arranged upstream of the first inlet and downstream of an air filter. A charge air recirculation device is provided for conducting part of the charge air compressed by the compressor to the second inlet, wherein the charge air recirculation device has a charge air recirculation line extending from a charge air channel to a second inlet, a regulating valve for regulating the mass flow through the charge air recirculation line, and an air injection nozzle at the second inlet.

U.S. Pat. No. 9,109,505 B2 describes a method for a charged engine. Here, a compressor recirculation duct is provided which connects a point downstream of a charge air cooler to a point upstream of a compressor which is connected in front of the charge air cooler. Under cold conditions, the compressor recirculation duct can be opened while at the same time a charge pressure control valve and an EGR valve are closed. The charge air cooler can thereby be heated.

U.S. Pat. No. 5,802,846A discloses an exhaust gas recirculation system in an internal combustion engine which has an intake circuit, an intake manifold and an exhaust manifold, wherein the intake circuit has an intake air pressure device. The exhaust gas recirculation system consists of an exhaust gas recirculation line for diverting an exhaust gas stream to the intake manifold, an intake air bypass line which is connected to the intake circuit in order to allow a flow of intake air from the intake circuit, and an exhaust gas recirculation cooler which is connected to the exhaust gas recirculation line and intake air bypass line.

U.S. Pat. No. 6,644,272 B2 describes a charged diesel engine in which an air filter is arranged upstream of a compressor. Before the compressed air reaches a manifold of the diesel engine, it passes successively through an air-cooled charge air cooler and a water cooled charge air cooler. This may firstly achieve a more effective cooling, and secondly, charge air which has been over-cooled in the air-cooled charge air cooler is heated again in the water-cooled charge air cooler.

Thus, each of the previous examples comprises one or more issues, including heating of the intake air during a cold-start or other condition where a component of the vehicle is not to temperature. In such an example, an auxiliary device is used to either heat coolant or to directly heat the intake air. An alternative includes a compressor recirculation valve which is only configured to recirculate a certain amount of compressed air. Thus, the compressor recirculation valve may not provide a sufficient amount of heating during cold conditions.

The inventors have identified the above issues and come up with a way to enable an energy-efficient avoidance of condensation in a charged engine with exhaust gas recirculation to at least partially solve them.

In one example, the issues described above may be addressed by an engine system with an internal combustion engine, an intake line for intake air arranged upstream of a compressor, an exhaust gas recirculation line opening into the intake line, and a charge air line which is arranged downstream of the compressor, wherein the engine system comprises a first charge air cooler configured as a gas-gas heat exchanger and arranged in a portion of the intake line upstream of the exhaust gas recirculation line relative to a direction of fresh air flow, further comprising a second charge air cooler arranged in the charge air line, the second charge air cooler configured as a liquid-gas heat exchanger.

As another example, a system, comprises a first charge air cooler configured to provide thermal communication between a compressed charge air and an uncompressed intake air, and a second charge air cooler configured to provide thermal communication between the compressed charge air and a liquid coolant. By doing this, thermal adjustments to fresh intake air and to charge air may be executed without liquid coolant.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
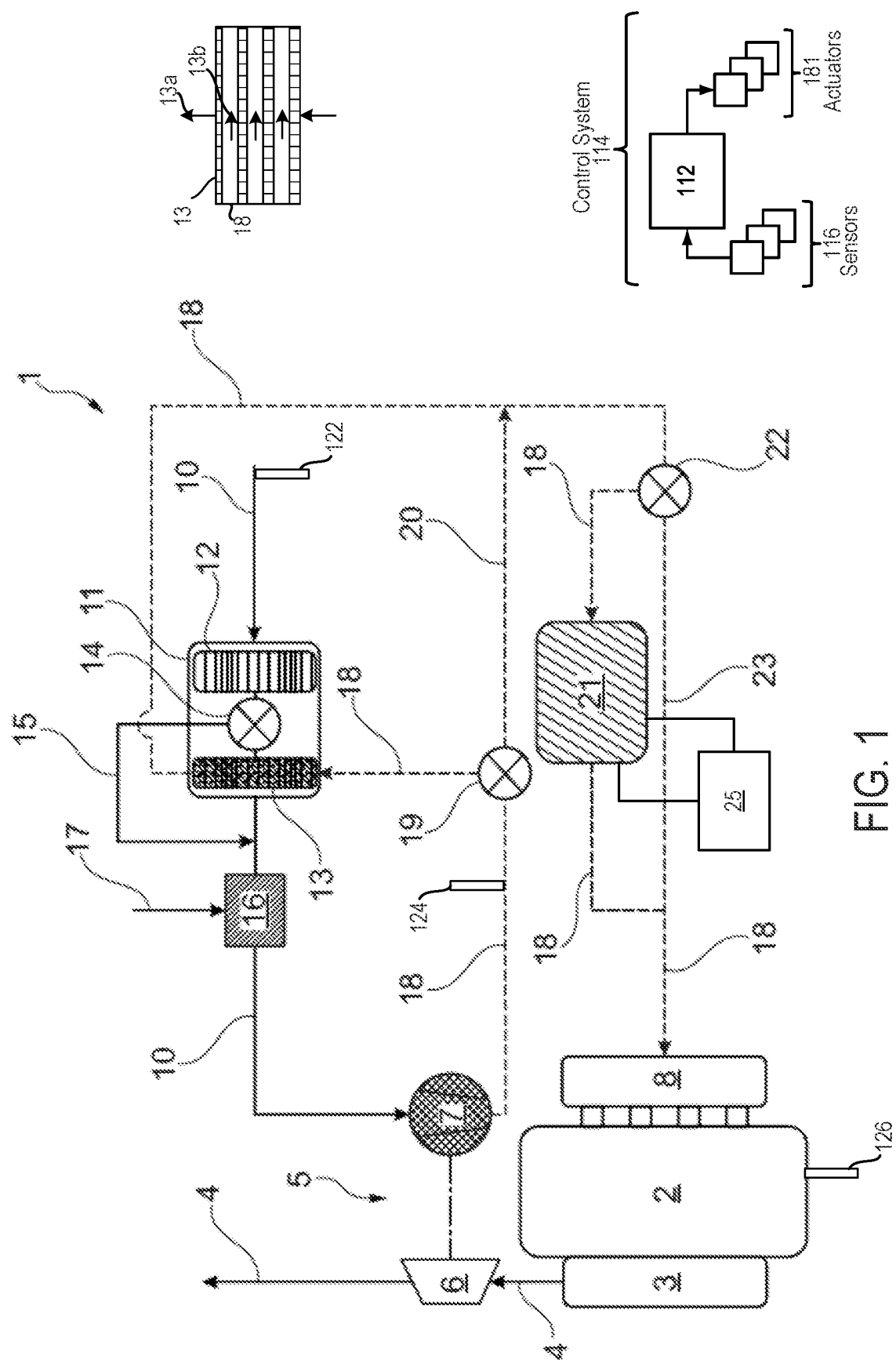
FIG. 1 an embodiment of an engine system according to the disclosure.

The following description relates to systems and methods for adjusting an intake air and/or compressed air temperature via a first cooler arranged upstream of a compressor and a second cooler arranged downstream of the compressor, as illustrated in FIG. 1. A first valve may be configured to direct compressed air to or away from the first cooler in response to one or more of an engine temperature, an intake air temperature, an EGR flow rate, or other condition. Additionally or alternatively, a second valve may be configured to bypass intake air around the first cooler when heating or cooling is undesired.

It is to be pointed out that the features and measures specified individually in the following description may be combined with one another in any desired technically meaningful way and disclose further configurations of the disclosure. The description characterizes and specifies the disclosure further, in particular in conjunction with figures.

The disclosure provides an engine system with an internal combustion engine. The internal combustion engine may in particular be a petrol engine or a diesel engine of a motor vehicle. More precisely, the internal combustion engine may be described as a charged internal combustion engine. The term "engine system" here refers to various components which belong to the internal combustion engine or which allow or support its function.

The engine system has an intake line for intake air arranged upstream of a compressor. The compressor is part of a turbocharger which serves to compress charge air before it is supplied to the internal combustion engine. Although in this context we refer to "charge air", it will become clear below that the composition of the charge air may in general differ from the aspirated fresh air. The compressor is normally coupled via a common shaft to a turbine which itself is driven by the exhaust gas stream from the internal combustion engine. In other words, the turbine is arranged in an exhaust gas line which may comprise various further elements e.g. catalysts.

The term "line" here and below refers to at least one component, in some cases to several components, which is/are configured to guide or conduct a fluid, in particular a gas or gas mixture. Insofar as a line is mentioned, this in itself is preferably unbranched, which does not exclude the possibility that other lines may branch off or open into this. Each line may comprise a plurality of separately produced portions connected together. The cross-section of a line may be constant or it may vary in portions. A line may be configured as a tube so that a length thereof amounts to a multiple of a transverse dimension, but it may also for example comprise a type of chamber which has comparable dimensions in all directions. In general, the wall of the corresponding line is sealed against the fluid. The intake line serves to draw in fresh air from the environment and conduct this in the direction of the internal combustion engine or primarily in the direction of the compressor. In general, the intake line is provided to conduct intake air. Although in this context the term "intake air" is used, it will become clear below that the intake line firstly conducts fresh air drawn in from the environment, but in particular also intake air which constitutes a gas mixture, the composition of which may generally differ from the aspirated fresh air. The intake line is arranged upstream of the compressor, i.e. in this context lines which are arranged downstream of the compressor are by definition not assigned to the intake line. The terms "upstream" and "downstream" here and below relate to the normal and prescribed flow direction of the fluid inside the respective line or component during operation of the engine system.

Furthermore, the engine system has an exhaust gas recirculation line opening into the intake line. The exhaust gas recirculation line, which is also referred to below as the EGR line, branches off the above-mentioned exhaust gas line and returns part of the exhaust gases so that these are supplied back to the internal combustion engine. This is achieved in that the EGR line opens into the intake line upstream of the compressor. Thus recirculated exhaust gases are mixed into the aspirated fresh air. Upstream of the position at which the EGR line opens, the intake line normally conducts fresh air, whereas downstream it conducts intake air which results from mixing the recirculated exhaust gases and fresh air. Thus charge air is generally formed from a mixture of aspirated fresh air and recirculated exhaust gases. It is evident that the recirculated exhaust gases may have already been catalytically treated before entering the EGR line or inside the line. Typically, an exhaust gas recirculation valve is provided which influences the exhaust gas flow through the EGR line. Such an exhaust gas recirculation valve may in particular be provided at the point at which the exhaust gas recirculation line opens into the intake line.

In addition, the engine system has a charge air line arranged downstream of the compressor. The charge air line adjoins the compressor, i.e. in operating state it supplies the charge air which has been compressed in the compressor. It has a first charge air cooler for charge air. This charge air cooler serves for tempering, usually cooling, the charge air which has been heated because of compression in the compressor. In other words, inside the first charge air cooler, a temperature (or temperature range) of the charge air is set with which it can be supplied to the internal combustion engine without problems. Thus, in this context, charge air may refer to uncompressed and compressed gases routed to the engine, wherein the gases may include fresh air, recirculated exhaust gases, and the like.

According to the disclosure, the first charge air cooler is configured as a gas-gas heat exchanger for exchange of heat with gas in the intake line. In other words, the first charge air cooler is configured to allow a heat exchange between a first gas, namely the charge air, and a second gas, namely the gas conducted in the intake line, while blocking a mixing of the two gases. To this end, the first charge air cooler comprises a thin metal wall in order to allow an enhanced heat flow. Other materials may also be used insofar as these have adequate heat conduction capacity to allow effective heat exchange. The first charge air cooler is configured to allow the heat exchange with the gas in the intake line, which may be fresh air or charge air, which is a mixture of fresh air and recirculated exhaust gases. For this, it is arranged adjoining an interior of the intake line. Conversely, it is provided that in the operating state, the gas in the intake line is in contact with the first charge air cooler. In one example, the outer wall of the first charge air cooler may also form part of the outer wall of the intake line. In some examples, the outer wall of the first charge air cooler may be in direct contact with the outer wall of the intake line and for example be connected thereto by substance bonding (e.g., a weld).

As already described, the charge air is heated in the compressor. In such an example, the charge air upstream of the compressor may comprise fresh air and low-pressure exhaust gas recirculate (LP-EGR). This applies for example also when, at low exterior temperatures and on cold start, the internal combustion engine still has a comparatively low temperature. The temperature of the compressed air on entering the first charge air cooler is, at least to a certain extent, independent thereof. The compressed air thus to some degree constitutes a directly available heat source which is used according to the disclosure to heat the intake air or fresh air in the intake line. In particular at low ambient temperatures, on reaching the first charge air cooler, the compressed air still has a significantly higher temperature than the aspirated fresh air. Often, the temperature of the compressed air is even higher than that of the intake air, since recirculated exhaust gases have been mixed therein. In any case, the heat exchange with the compressed air via the first charge air cooler allows heating of the fresh intake air, whereby the temperature of the intake air may be above the dew point even when reaching the compressor. Condensation or ice formation may thus be mitigated.

The solution according to the disclosure for avoiding condensate formation is energy-efficient since no additional electric heating elements are needed. Also, the heat transfer takes place to a certain extent directly from the charge air to the intake air or fresh air without an intermediate transfer medium, e.g. a liquid coolant. In this way, firstly the heat transfer becomes more efficient, and secondly no lines for liquid coolant are needed. Also, in contrast to heat transfer via an intermediate transfer medium, the heat transfer can be achieved via a single heat exchanger, namely the first charge air cooler.

Under some circumstances, the heat transfer from the charge air into the intake air may also be effective if the generally colder fresh air has already been mixed with recirculated exhaust gases. Since however it is known that heat transmission is more effective when a greater temperature difference exists, it may be desired that the heat transfer takes place before the recirculated exhaust gases are mixed in. According to such an embodiment, the recirculation line opens into the intake line downstream of the first charge air cooler. This means that the recirculation line opens into the intake line at a position which lies downstream of the position at which the first charge air cooler is arranged on or in the intake line. The first charge air cooler is here configured to exchange heat with fresh air in the intake line. In other words, the first charge air cooler comes into thermal contact with unmixed fresh air, which is then heated by heat transfer with the charge air. Downstream, the normally even warmer recirculated exhaust gases are mixed into the fresh air. When the aspirated fresh air is combined with the exhaust gases from the exhaust gas recirculation line, there is at least a high probability that the temperature of the resulting gas mixture lies above the dew point of water. Thus no condensation of moisture or ice formation occurs which may degrade the downstream compressor.

As already mentioned above, the outer wall of the first charge air cooler may form part of the outer wall of the intake line or could be in direct contact with this wall. In general, the heat transmission can however be substantially improved if the first charge air cooler is arranged at least partially in the intake line. In other words, the first charge air cooler protrudes to some extent into the interior of the intake line, or is even arranged completely inside this interior. In operating state, the intake air or fresh air flows around at least parts of the first charge air cooler. In order firstly to maximize the surface area and secondly not excessively disrupt the flow of intake air or fresh air, the charge air cooler may for example have a plurality of tubes or hollow ribs through which charge air is conducted and between which the intake air or fresh air flows. In particular, the first charge air cooler may be arranged at least partially together with an air filter in an air filter housing inside the intake line. Such an air filter housing, which could partially also be described as an airbox, under certain circumstances also serves to calm the air flow of the fresh air. In this embodiment, we could also speak of an "air cleaner with integrated heating core" (ACIHC), wherein the first charge air cooler acts as a heating element.

In principle, all aspirated air may be conducted along or through the first charge air cooler. Under some circumstances however, it may also be advantageous if at least part of the aspirated air is not heated for part of the time. According to a corresponding embodiment, an intake bypass line bypassing the first charge air cooler is connected to the intake line upstream and downstream thereof, wherein a volume flow ratio between the intake line and the intake bypass line can be influenced by at least one intake bypass valve. The intake bypass line is evidently configured, like the intake line, to conduct intake air or fresh air. It is connected to the intake line firstly upstream and secondly downstream of the first charge air cooler, so we could say it branches off the intake line upstream of the first charge air cooler and opens into this again downstream thereof. In other words, gas flowing through the intake bypass line bypasses the first charge air cooler. A volume flow ratio between the intake line and intake bypass line can be influenced by at least one intake bypass valve. The volume flow ratio is the ratio of the volume flow in the intake bypass line firstly and in the intake line secondly.

The intake bypass valve may perform widely varying functions. For example, it may be configured to optionally block or open the intake bypass line. Alternatively or additionally, it could be configured to optionally block or open the portion of the intake line which is bypassed by the intake bypass line. In addition, a quantitative change in opening state of the intake bypass line and/or intake line is possible, so that at least one of the lines may also be able to be partially opened. Insofar as the EGR line opens into the intake line downstream of the first charge air cooler, the intake bypass line may also be known as a fresh air bypass line, and the intake bypass valve as a fresh air bypass valve.

In general, it is preferred that a second charge air cooler, configured as a liquid-gas heat exchanger, is arranged downstream of the compressor. In other words, it is possible to cool the charge air by two separate charge air coolers. However, the second charge air cooler is configured as a liquid-gas heat exchanger, i.e. it is connected to a cooling circuit in which a liquid coolant circulates (e.g. a water-glycol mixture or similar). The second charge air cooler is thus provided to conduct internally the liquid coolant with which the charge air can exchange heat. In particular, the second charge air cooler may be connected to a low-temperature heat exchanger in a low temperature cooling circuit, while the internal combustion engine (or a water jacket thereof) is connected to a high-temperature heat exchanger in a high-temperature cooling circuit. Under some circumstances, the second charge air cooler and the internal combustion engine may be cooled by one and the same cooling circuit for at least part of the time. It is evident that the coolant flow in the respective cooling circuit is generated by at least one pump, which may either be coupled as a mechanical pump to the internal combustion engine or may be able to be operated as an electric pump e.g. via a vehicle battery. In principle, the use of the second charge air cooler may entail various advantages. Firstly, cooling of the charge air may take place independently of heating of the fresh air or intake air in the first charge air cooler. This may be advantageous for example if, at high exterior temperatures, a substantial heating of the fresh air or intake air is undesired or difficult, while simultaneously significant cooling of the charge air is desired. It may also be taken into account that the liquid coolant in the second charge air cooler has a higher thermal capacity and heat conduction capacity than e.g. the fresh air or intake air, which increases the efficiency of the cooling. However, the liquid coolant takes substantially longer to heat up than gases, e.g. after a cold start, as it is thermally sluggish. For this reason, direct heat transmission from the charge air to the fresh air or intake air in the first charge air cooler is often desired if rapid heating of the fresh air or intake air is to be achieved.

Although both charge air coolers are arranged downstream of the compressor, it is in principle conceivable that, relative to the gas stream, they are arranged parallel to each other or such that they are arranged in two line portions, one of which branches off the other and opens into this again later. At least one valve may change the volume flows of charge air through the two charge air coolers. According to another embodiment, the one charge air cooler is arranged downstream of the other charge air cooler in the charge air line. In other words, the two charge air coolers are arranged successively relative to the gas stream, and the charge air flows successively firstly through the one and then through the second charge air cooler. This includes the possibility, as will be explained below, that the charge air can optionally bypass at least one of the charge air coolers.

Normally, the second charge air cooler is arranged downstream of the first charge air cooler. In other words, when the charge air passes through both charge air coolers, it first passes through the first charge air cooler and then through the second charge air cooler. This may be desired with regard to cooling of the charge air in the second charge air cooler, which is configured as a liquid-gas heat exchanger, which may be more efficient than the first cooler. In other words, the temperature change of the charge air in the second charge air cooler is normally greater than in the first charge air cooler. In this configuration, the charge air thus reaches the first charge air cooler in a state in which it still has a comparatively high temperature. The temperature difference from the fresh air or intake air is therefore comparatively great, which enhances the heat transmission to the charge air.

In situations in which the ambient temperature is however sufficiently high to make it unlikely that condensation water will form inside the intake air, heating of the fresh air or intake air by the first charge air cooler is unnecessary or even counter-productive. Insofar as heating of the fresh air or intake air should be interrupted or at least reduced at least temporarily, this can be achieved firstly in that at least part of the charge air passes through the above-mentioned intake air bypass line. Alternatively or additionally, it is possible that a first charge air bypass line bypassing the first charge air cooler is connected to the charge air line upstream and downstream of the first charge air cooler, wherein a volume flow ratio between the charge air line and the first charge air bypass line can be influenced by at least a first charge air bypass valve. The first charge air bypass line, like the charge air line, is configured to conduct charge air. It is connected to the charge air line firstly upstream and secondly downstream of the first charge air cooler, so we could say it branches off the charge air line upstream of the first charge air cooler and opens into this again downstream thereof. In other words, charge air flowing through the first charge air bypass line bypasses the first charge air cooler. A volume flow ratio between the charge air line and the charge air bypass line can be influenced by at least a first charge air line charge air bypass valve. For example, the first charge air bypass valve may be configured to optionally block or open the first charge air bypass line. Alternatively or additionally, it could be configured to optionally block or open the portion of the charge air line which is bypassed by the first charge air bypass line. In addition, a quantitative change in opening state of the first charge air bypass line and/or intake line is possible, so that at least one of the lines may also be able to be partially opened. In principle, the first charge air cooler may be bypassed optionally or simultaneously via the intake air bypass line and the first charge air bypass line. In both cases, it may be taken into account that only a slight cooling, or even no cooling, of the charge air takes place in the first charge air cooler. Therefore in this option, normally the above-mentioned second charge air cooler is desired in order to provide adequate charge air cooling at a wider range of operating parameters.

According to a further embodiment, it is possible that a second charge air bypass line bypassing the second charge air cooler is connected to the charge air line upstream and downstream of the second charge air cooler, wherein a volume flow ratio between the charge air line and the second charge air bypass line can be influenced by at least one second charge air bypass valve. The second charge air bypass line, like the charge air line, is configured to conduct charge air. It is connected to the charge air line firstly upstream and secondly downstream of the second charge air cooler, so we could say it branches off the charge air line upstream of the second charge air cooler and opens into this again downstream thereof. In other words, charge air flowing through the second charge air bypass line bypasses the second charge air cooler, A volume flow ratio between the charge air line and the second charge air bypass line can be influenced by at least one second charge air bypass valve. For example, the second charge air bypass valve may be configured to optionally block or open the second charge air bypass line. Alternatively or additionally, it could be configured to optionally block or open the portion of the charge air line which is bypassed by the second charge air bypass line. In addition, a quantitative change in opening state of the second charge air bypass line and/or intake line is possible, so that at least one of the lines may also be able to be partially opened. In principle, an at least partial bypassing of the second charge air cooler means that only little or even no cooling of the charge air takes place there. For part of the time however, cooling in the first charge air cooler may be sufficient, e.g. if there is a great temperature difference between the charge air and fresh air or intake air. An at least partial bypassing of the second charge air cooler may be useful in particular, but not exclusively, if the second charge air cooler is arranged upstream of the first charge air cooler.

The various above-mentioned valves may be controlled by a control unit. The corresponding control unit is configured to actuate at least one of the valves. The above-mentioned at least one pump can also be actuated via the control unit. The control unit may be integrated in the at least one valve, or it may be an external control unit which is connected to the at least one valve via suitable control lines. The control unit may in some cases comprise a plurality of mutually spaced components. The control unit may be implemented at least partially by software. Furthermore, the control unit may be implemented partially by a device which fulfils other functions as well as controlling the at least one valve.

Turning now to FIG. 1, it shows a diagrammatic depiction of an engine system 1 with an internal combustion engine 2, e.g. a diesel engine or petrol engine of a motor vehicle. The internal combustion engine 2 may be connected in a high-temperature cooling circuit of a high-temperature heat exchanger (e.g., a radiator) which is not shown here for reasons of clarity.

A liquid coolant, e.g. a water-glycol mixture, flows through a water jacket (not shown in more detail here) of the internal combustion engine 2 where it absorbs heat, which is dissipated again on passing through the high-temperature heat exchanger.

The internal combustion engine 2 is a charged engine to which compressed charge air is supplied by a compressor 7 of a turbocharger 5. The compressor 7 is coupled in the known fashion, via a common shaft, to a turbine 6 of the turbocharger. The turbine 6 is arranged in an exhaust gas line 4 of the engine system 1 which is connected to an exhaust manifold 3 of the internal combustion engine 2. Intake air, which is drawn in from the environment of the vehicle and conducted towards the compressor 7 via the intake line 10, is supplied to the compressor 7. An exhaust gas recirculation line or EGR line 17 opens into the intake line 10 at an exhaust gas recirculation valve or EGR valve 16. Via the EGR line 17, parts of the exhaust gases generated in the internal combustion engine 2 can be supplied, in some cases after catalytic treatment, to the internal combustion engine 2 again together with fresh air. Accordingly, the EGR line 17 branches off the exhaust gas line 4 and is illustrated as a low-pressure EGR line 17. In some examples, additionally or alternatively, the engine system 1 may comprise a high-pressure EGR configuration wherein exhaust gas are routed to a portion of the intake system downstream of the compressor 7.

A housing 11 with an air filter 12 is arranged in the intake line 10. Furthermore, a first charge air cooler 13 is arranged inside the housing 11. During some conditions, ambient air is drawn in via the intake line 10, cleaned in the air filter 12, and finally reaches the EGR valve 16 where it is mixed with recirculated exhaust gases from the EGR line 17. An intake bypass line 15 (which could also be described as a fresh air bypass line) leads from an intake bypass valve 14 (which could also be called a fresh air bypass valve) also arranged in the housing 11. The line bypasses the first charge air cooler 13 by branching off the intake line 10 upstream thereof and opening back into the intake line 10 downstream thereof. The intake bypass valve 14 may be configured for various functions. In the simplest case, it may be configured to optionally open or block a volume flow through the intake bypass line 15. Opening of the volume flow through the intake bypass line 15 may be associated with blocking of the volume flow through the intake line 10, and vice versa.

Downstream of the compressor 7, the charge air passes through a charge air line 18 which may consist of several parts and opens into an intake manifold 8 of the internal combustion engine 2. Before being supplied to the internal combustion engine 2, the charge air which has been heated in the compressor 7 is cooled, firstly by the first charge air cooler 13 and secondly by a second charge air cooler 21 which is arranged in the charge air line 18 downstream of the first charge air cooler 13 relative to a direction of charge air flow. The first charge air cooler 13 is configured as an air-air heat exchanger, and is configured to allow heat exchange between the fresh air in the intake line 10 and the charge air in the charge air line 18. The heated charge air stands in indirect thermal contact with the fresh air via the wall of the first charge air cooler 13, whereby heating of the fresh air and simultaneous cooling of the charge air take place. This may be advantageous in particular on a cold start at low ambient temperature. Whereas for example the internal combustion engine 2 and its high-temperature cooling circuit have not yet heated up on cold start and hence are excluded as a heat source, the charge air in the compressor 7 undergoes a significant heating immediately from start-up so that it can be used to heat the fresh air in the manner described. Without heating, when the fresh air meets the recirculated exhaust gas from the EGR line 17, moisture could condense out and degrade the compressor 7.

Under some circumstances, cooling of the charge air in the first charge air cooler 13 is insufficient to be able to supply the charge air straight to the internal combustion engine 2. In particular, this applies if part of the fresh air has bypassed the first charge air cooler 13 via the intake bypass valve 14. For this reason, the second charge air cooler 21, which is however configured as a liquid-gas heat exchanger, is provided downstream of the first charge air cooler 13. The second charge air cooler may be connected to a low-temperature heat exchanger (not shown here) in a low-temperature cooling circuit 25. Whereas the low-temperature cooling circuit 25 is normally separated from the above-mentioned high-temperature cooling circuit, the same coolant may be used in both cooling circuits. The liquid coolant used in the second charge air cooler 21 has a high thermal capacity and high heat conduction capacity in comparison with gases, so cooling of the charge air in the second charge air cooler 21 is normally very efficient.

As described above, at least part of the fresh air may bypass the first charge air cooler 13 via the intake bypass line 15, so that it undergoes no heating there. Alternatively or additionally, at least part of the charge air may bypass the first charge air cooler 13. For this, a first charge air bypass line 20 is provided which branches off the charge air line 18 upstream of the first charge air cooler 13 and opens into the charge air line 18 downstream of the first charge air cooler 13. The volume flow inside the first charge air bypass line 20 can be changed via a first charge air bypass valve 19. Preferably, the first charge air bypass valve 19 is steplessly adjustable (e.g., from 0-100 and values therebetween). It may be desired for example to bypass the first charge air cooler 13 if a sufficiently high ambient temperature is present, such that no heating of the fresh air occurs. In one example, the fresh air bypass valve 19 may be moved in a first direction to flow more compressed air to the first charge air cooler 13 and moved in a second direction to flow less compressed air to the first charge air cooler 13.

It would furthermore be optional that, after passing through the first charge air cooler 13, the charge air has already cooled so far that further cooling may not be desired or its temperature may fall too low when it passes through the second charge air cooler 21. Therefore, a second charge air bypass line 23 is provided, which branches off the charge air line 18 upstream of the second charge air cooler 21 and opens into the charge air line 18 downstream of the second charge air cooler 21. The volume flow inside the second charge air bypass line 23 can be changed via a second charge air bypass valve 22. Preferably, the second charge air bypass valve 22 is steplessly adjustable. The second charge air bypass valve 22 may be moved in a first direction to flow more charge air to the second charge air cooler 21 and in a second direction to flow less charge air to the second charge air cooler 21.

A more detailed view of the first charge air cooler 13 illustrates fresh air 13a entering the first charger air cooler 13 in a first direction and compressed charge air 13b flowing through the first charge air cooler 13 in a second direction angled to the first direction. In one example, each of the intake line 10 and the charge air line 18 are divided into a plurality of passages criss-crossing one another through the first charge air cooler 13 while remaining fluidly separated from one another via thin sheets of metal or other similarly thermally conductive material.

The various valves 14, 19, 22 may be set depending on the measured temperatures of the fresh air or charge air. Under some circumstances, all valves 14, 19, 22 may be controlled by one and the same control unit which is also connected to temperature sensors.

Engine system 1 may further include control system 114. Control system 114 is shown receiving information from a plurality of sensors 116 (various examples of which are described herein) and sending control signals to a plurality of actuators 181 (various examples of which are described herein). The actuators may include the actuators of the first charge air bypass valve 19 and the second charge air bypass valve 22. The sensors may include a first temperature sensor 122 configured to sense a temperature of fresh air, a second temperature sensor 124 configured to sense a temperature of compressed air, and a third temperature sensor 126 configured to sense a temperature of the engine.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 2:
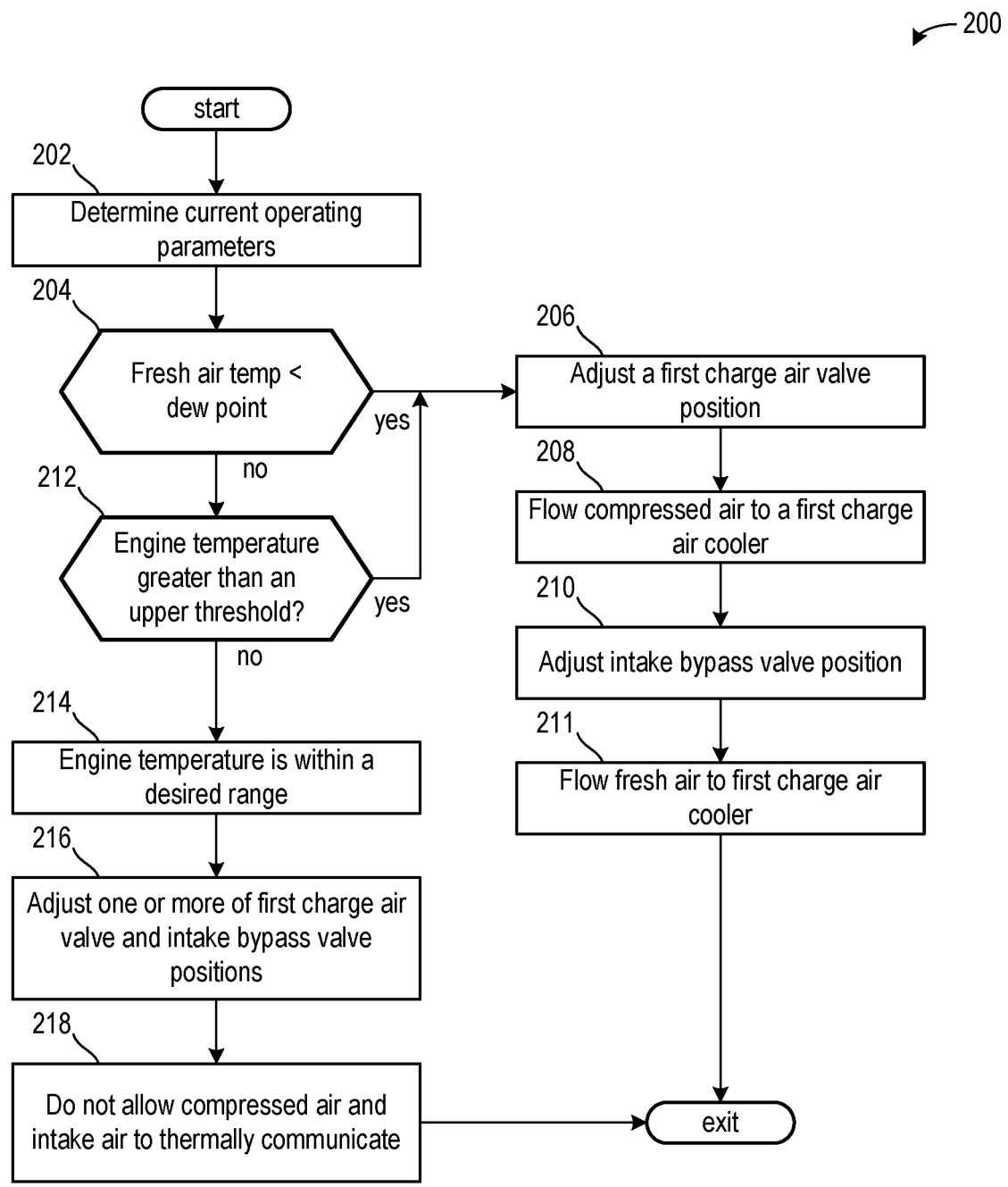
FIG. 2 illustrates a method for adjusting compressed air and/or intake air flow to the first heat exchanger.

Turning to FIG. 2, it shows a method for adjusting compressed air flow and intake air flow to the first charge air cooler in response to at least an engine temperature. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining, estimating, and/or measuring current operating parameters. Current operating parameters may include but are not limited to one or more of manifold vacuum, throttle position, ambient temperature, engine temperature, vehicle speed, compressor speed, EGR flow rate, and an air/fuel ratio.

The method 200 proceeds to 204, which includes determining if a fresh air temperature is less than a dew point temperature. As is known, the dew point temperature is a temperature at which water vapor in a gas condenses and forms water droplets onto a surface. If the fresh air temperature is less than the dew point temperature or will be less than the dew point temperature after contacting a surface in an intake passage, then the method 200 proceeds to 206, which includes adjusting a first charge air valve position. In the example where the fresh air temperature is less than the dew point temperature or will be less than the dew point temperature, the first charge air valve is adjusted in a first direction to increase compressed charge air flow to the first charge air cooler.

The method 200 proceeds to 208, which includes flowing compressed air to a first charge air cooler. At the first charge air cooler, the compressed air may flow across a thermally conductive surface so that heat from the compressed air may heat the surface. As such, compressed air is blocked from mixing with fresh, uncompressed air.

The method 200 proceeds to 210, which includes adjusting an intake bypass valve position. In one example, the intake bypass valve position is adjusted in a first direction so that more fresh air flows through the first charge air cooler and less fresh air bypasses the first charge air cooler.

The method 200 proceeds to 211, which includes flowing fresh air to the first charge air cooler. After flowing through the first charge air cooler, the fresh air may mix with EGR (if active) and flow to the compressor. In this way, fresh air is heated via the surface which is in contact with compressed air prior to mixing with EGR. In this way, a heating effect of the compressed air on the fresh air may be enhanced relative to configurations that mix EGR with the fresh air upstream of the first charge air cooler. By arranging a thin, thermally conductive sheet between the compressed gas and the fresh air, the compressed gas and the fresh air may be blocked from mixing and a flow rate of the fresh air may be maintained as the fresh air is heated.

Returning to 204, if the fresh air temperature is not less than the dew point temperature or if the fresh air temperature will not be less than the dew point temperature, then the method 200 proceeds to 212, which includes determining if an engine temperature is greater than an upper threshold. In one example, the upper threshold corresponds to a temperature higher than an upper temperature of a desired engine operating range. If the engine temperature is greater than the upper threshold, then the engine may be too hot and the method 200 proceeds to 206 through 211 as described above. Under the present conditions, the compressed charge air is cooled via the sheet in the first charge air cooler. That is to say, the fresh air may cool the sheet, which in turn cools the compressed charge air before the compressed charge air flows to the second charge air cooler. By doing this, coolant may be used in other portions of the engine system to enhance cooling thereto.

If the engine temperature is not greater than the upper threshold, then the method 200 proceeds to 214, which includes the engine temperature being with the desired range.

The method 200 proceeds to 216, which includes adjusting one or more of the first charge air valve and the intake bypass valve positions. In one example, each of the first charge air valve and the intake bypass valve are moved in a second direction to reduce an amount of compressed charge air and fresh air flowing to the first charge air cooler. Additionally or alternatively, only one of the first charge air valve and the intake bypass valve are moved in the second direction to reduce an amount of compressed charge air or fresh air flowing to the first charge air cooler. In some examples, as indicated at 218, the compressed air and intake air are not allowed to thermally communicate. In one example, if it is expected that heating of the fresh air will be desired, then only the intake bypass valve may be moved in the second direction, thereby allowing the compressed charge air to flow through the first charge air cooler without heating the fresh air. In this way, a temperature of the first charge air cooler may be maintained. Additionally or alternatively, if it is expected that cooling of the compressed charge air will be desired, then only the first charge air valve may be moved in the second direction, thereby allowing fresh air to flow through the first charge air cooler without cooling the compressed charge air. In this way, a temperature of the first charge air cooler may be maintained so that when cooling of the compressed charge air is desired, a cooling effect may be provided more quickly.

In this way, an engine system comprises a first charge air cooler configured as a gas-to-gas cooler upstream of a second charge air cooler, which is configured as a liquid-to-gas cooler. The first charge air cooler may allow thermal communication between compressed charge air and fresh intake air. The first charge air cooler is configured to block mixing between the compressed charge air and the intake air. The technical effect of allowing thermal communication between the compressed charge air and the fresh intake air is to provide enhanced temperature control of charge air along with a method for reducing a cold-start duration without the use of an auxiliary device.

An embodiment of an engine system with an internal combustion engine, an intake line for intake air arranged upstream of a compressor, an exhaust gas recirculation line opening into the intake line, and a charge air line which is arranged downstream of the compressor, wherein the engine system comprises a first charge air cooler configured as a gas-gas heat exchanger and arranged in a portion of the intake line upstream of the exhaust gas recirculation line relative to a direction of fresh air flow, further comprising a second charge air cooler arranged in the charge air line, the second charge air cooler configured as a liquid-gas heat exchanger.

A first example of the engine system further includes where the exhaust gas recirculation line is a low-pressure exhaust gas recirculation line.

A second example of the engine system, optionally including the first example, further includes where the first charge air cooler is arranged in a housing, wherein an air filter is arranged in the housing upstream of the first charge air cooler.

A third example of the engine system, optionally including one or more of the previous examples, further includes where an intake bypass line configured to bypass the first charge air cooler is connected to the intake line upstream of the first charge air cooler at its inlet and downstream the first charge air cooler, between the first charge air cooler and the exhaust gas recirculation line at its outlet, wherein a volume flow ratio between the intake line and the intake bypass line is adjusted via an intake bypass valve.

A fourth example of the engine system, optionally including one or more of the previous examples, further includes where the second charge air cooler is arranged downstream of the first charge air cooler and the compressor.

A fifth example of the engine system, optionally including one or more of the previous examples, further includes where the charge air line is configured to flow compressed charge air from the compressor to the first charge air cooler.

A sixth example of the engine system, optionally including one or more of the previous examples, further includes where compressed charge air flowing through the first charge air cooler is blocked from mixing with fresh air flowing through the first charge air cooler while thermally communicating therewith.

A seventh example of the engine system, optionally including one or more of the previous examples, further includes where a first charge air bypass line and a first charge air bypass valve, wherein the first charge air bypass line is configured to flow compressed charge air from a portion of the charge air line upstream of the first charge air cooler to a portion of the charge air line between the first charge air cooler and the second charge air cooler.

An embodiment of a system, comprises a first charge air cooler configured to provide thermal communication between a compressed charge air and an uncompressed intake air and a second charge air cooler configured to provide thermal communication between the compressed charge air and a liquid coolant.

A first example of the system further includes where the first charge air cooler is arranged in an intake line upstream of an exhaust gas recirculation line relative to a direction of air flow.

A second example of the system, optionally including the first example, further includes where the first charge air cooler blocks the compressed charge air from mixing with the uncompressed intake air.

A third example of the system, optionally including one or more of the previous examples, further includes where the uncompressed intake air flows through the first charge air cooler in a first direction and the compressed charge air flows through the first charge air cooler in a second direction, normal to the first direction.

A fourth example of the system, optionally including one or more of the previous examples, further includes where the intake line comprises an intake bypass line and an intake bypass line valve, wherein the intake bypass line is configured to direct a portion of uncompressed intake air away from the first charge air cooler based on a position of the intake bypass line valve.

A fifth example of the system, optionally including one or more of the previous examples, further includes where a housing comprises the first charge air cooler, the intake bypass line valve, and an air filter.

A sixth example of the system, optionally including one or more of the previous examples, further includes where a charge air line, which extends from a compressor outlet to an engine, comprises a first charge air cooler bypass line and a first charge air cooler bypass valve, wherein the first charge air cooler bypass line is configured to direct a portion of the compressed charge air away from the first charge air cooler based on a position of the first charge air cooler bypass valve.

An embodiment of an intake system for an engine, comprises a first charge air cooler configured to provide thermal communication between a compressed charge air and an uncompressed intake air, a second charge air cooler configured to provide thermal communication between the compressed charge air and a liquid coolant, and a controller with computer-readable instructions stored on non-transitory memory thereof that when executed enable the controller to adjust a position of at least one of an intake bypass line valve and a position of a first charge air cooler bypass valve in a first direction to flow more of the uncompressed intake air and the compressed charge air, respectively, through the first charge air cooler in response to a cold-start or an engine temperature exceeding a threshold temperature.

A first example of the intake system further includes where the instructions further enable the controller to adjust the position of at least one of the intake bypass line valve and the position of the first charge air cooler bypass valve in a second direction to flow less of the uncompressed intake air and the compressed charge air, respectively, through the first charge air cooler in response to an engine temperature being within a desired range and a temperature of the uncompressed intake air being above a dew point.

A second example of the system, optionally including the first example, further includes where the first charge air cooler comprises at least one thermally conductive sheet arranged between a portion of a charge air line passing through the first charge air cooler and a portion of an intake air line passing through the first charge air cooler.

A third example of the system, optionally including one or more of the previous examples, further includes where an exhaust gas recirculation line is fluidly coupled to the intake air line in a region between the first charge air cooler and a compressor.

A fourth example of the system, optionally including one or more of the previous examples, further includes where the second charge air cooler is configured to thermally communicate with only compressed charge air.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a first charge air cooler configured to provide thermal communication between a compressed charge air and an uncompressed intake air, wherein the first charge air cooler blocks the compressed charge air from mixing with the uncompressed intake air; and
a second charge air cooler configured to provide thermal communication between the compressed charge air and a liquid coolant.

2. The system of claim 1, wherein the first charge air cooler is arranged in an intake line upstream of an exhaust gas recirculation line relative to a direction of air flow.

3. The system of claim 1, wherein the uncompressed intake air flows through the first charge air cooler in a first direction and the compressed charge air flows through the first charge air cooler in a second direction, normal to the first direction.

4. The system of claim 1, wherein the intake line comprises an intake bypass line and an intake bypass line valve, wherein the intake bypass line is configured to direct a portion of uncompressed intake air away from the first charge air cooler based on a position of the intake bypass line valve.

5. The system of claim 4, wherein the first charge air cooler, the intake bypass line valve, and an air filter are housed in a housing.

6. The system of claim 1, wherein a charge air line, which extends from a compressor outlet to an engine, comprises a first charge air cooler bypass line and a first charge air cooler bypass valve, wherein the first charge air cooler bypass line is configured to direct a portion of the compressed charge air away from the first charge air cooler based on a position of the first charge air cooler bypass valve.

7. An engine system with an internal combustion engine, an intake line for intake air arranged upstream of a compressor, an exhaust gas recirculation line opening into the intake line, and a charge air line which is arranged downstream of the compressor, wherein the engine system comprises:
a first charge air cooler configured as a gas-gas heat exchanger and arranged in a portion of the intake line upstream of the exhaust gas recirculation line relative to a direction of fresh air flow, wherein the charge air line is configured to flow compressed charge air from the compressor to the first charge air cooler; and
a second charge air cooler arranged in the charge air line, the second charge air cooler configured as a liquid-gas heat exchanger.

8. The engine system of claim 7, wherein the exhaust gas recirculation line is a low-pressure exhaust gas recirculation line.

9. The engine system of claim 7, wherein the first charge air cooler is arranged in a housing, wherein an air filter is arranged in the housing upstream of the first charge air cooler.

10. The engine system of claim 7, wherein an intake bypass line configured to bypass the first charge air cooler is connected to the intake line upstream of the first charge air cooler at an inlet of the intake bypass line and downstream the first charge air cooler, between the first charge air cooler and the exhaust gas recirculation line at an outlet of the intake bypass line, wherein a volume flow ratio between the intake line and the intake bypass line is adjusted via an intake bypass valve.

11. The engine system of claim 7, wherein the second charge air cooler is arranged downstream of the first charge air cooler and the compressor.

12. The engine system of claim 7, wherein compressed charge air flowing through the first charge air cooler is blocked from mixing with fresh air flowing through the first charge air cooler while thermally communicating therewith.

13. The engine system of claim 7, further comprising a first charge air bypass line and a first charge air bypass valve, wherein the first charge air bypass line is configured to flow compressed charge air from a portion of the charge air line upstream of the first charge air cooler to a portion of the charge air line between the first charge air cooler and the second charge air cooler.

14. An intake system for an engine, comprising:
a first charge air cooler configured to provide thermal communication between a compressed charge air and an uncompressed intake air;
a second charge air cooler configured to provide thermal communication between the compressed charge air and a liquid coolant; and
a controller with computer-readable instructions stored on non-transitory memory thereof that when executed enable the controller to:
adjust a position of at least one of an intake bypass line valve and a position of a first charge air cooler bypass valve in a first direction to flow more of the uncompressed intake air and the compressed charge air, respectively, through the first charge air cooler in response to a cold-start or an engine temperature exceeding a threshold temperature.

15. The intake system for the engine of claim 14, wherein the instructions further enable the controller to adjust the position of at least one of the intake bypass line valve and the position of the first charge air cooler bypass valve in a second direction to flow less of the uncompressed intake air and the compressed charge air, respectively, through the first charge air cooler in response to an engine temperature being within a desired range and a temperature of the uncompressed intake air being above a dew point.

16. The intake system of claim 14, wherein the first charge air cooler comprises at least one thermally conductive sheet arranged between a portion of a charge air line passing through the first charge air cooler and a portion of an intake air line passing through the first charge air cooler.

17. The intake system of claim 16, wherein an exhaust gas recirculation line is fluidly coupled to the intake air line in a region between the first charge air cooler and a compressor.

18. The intake system of claim 14, wherein the second charge air cooler is configured to thermally communicate with only compressed charge air.

* * * * *